(12) United States Patent
Bender et al.

(10) Patent No.: US 9,326,071 B2
(45) Date of Patent: *Apr. 26, 2016

(54) MEDIA CONTENT SUGGESTION BASED ON PLAYBACK ZONE AWARENESS

(71) Applicant: Sonos, Inc., Santa Barbara, CA (US)

(72) Inventors: Kristen Bender, Cambridge, MA (US); Ron Kuper, Arlington, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/921,666

(22) Filed: Oct. 23, 2015

(65) Prior Publication Data

US 2016/0044415 A1    Feb. 11, 2016

Related U.S. Application Data

(63) Continuation of application No. 14/186,924, filed on Feb. 21, 2014, now Pat. No. 9,226,072.

(51) Int. Cl.

| | |
|---|---|
| *H04B 3/00* | (2006.01) |
| *H04R 3/12* | (2006.01) |
| *H04R 5/04* | (2006.01) |
| *H04R 29/00* | (2006.01) |
| *H04R 27/00* | (2006.01) |

(52) U.S. Cl.
CPC .. *H04R 3/12* (2013.01); *H04R 5/04* (2013.01); *H04R 27/00* (2013.01); *H04R 29/00* (2013.01); *H04R 29/001* (2013.01); *H04R 2227/003* (2013.01); *H04R 2227/005* (2013.01); *H04R 2430/01* (2013.01)

(58) Field of Classification Search
None
See application file for complete search history.

(56) References Cited

U.S. PATENT DOCUMENTS

| | | |
|---|---|---|
| 5,848,410 A | 12/1998 | Walls et al. |
| 5,859,638 A | 1/1999 | Coleman et al. |
| 5,923,902 A | 7/1999 | Inagaki |

(Continued)

FOREIGN PATENT DOCUMENTS

WO    0153994 A2    7/2001

OTHER PUBLICATIONS

"AudioTron Quick Start Guide, Version 1.0", Voyetra Turtle Beach, Inc., Mar. 2001, 24 pages.

(Continued)

*Primary Examiner* — Muhammad N Edun
(74) *Attorney, Agent, or Firm* — McDonnell Boehnen Hulbert & Berghoff LLP

(57) ABSTRACT

In an example implementation, a computing system receives zone data that identifies a particular zone of a playback system, where the particular zone includes one or more playback devices. The computing system identifies audio content based on the zone data. Identifying audio content may involve determining that particular audio content is preferred in the particular zone and identifying audio content corresponding to the particular audio content that is preferred in the particular zone. After identifying the audio content, the computing system provides an indication of the identified audio content to the playback system. The computing system receives data indicating audio items that were selected from the identified audio content via the playback system and provides an indication of the audio items that were selected from the identified audio content, the indication comprising respective sources from which the audio items are retrievable by the playback system.

20 Claims, 6 Drawing Sheets

(56) References Cited

U.S. PATENT DOCUMENTS

| | | |
|---|---|---|
| 6,029,195 A | 2/2000 | Herz |
| 6,108,686 A | 8/2000 | Williams, Jr. |
| 6,256,554 B1 | 7/2001 | DiLorenzo |
| 6,288,718 B1 | 9/2001 | Laursen et al. |
| 6,349,339 B1 | 2/2002 | Williams |
| 6,404,811 B1 | 6/2002 | Cvetko et al. |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 6,826,283 B1 | 11/2004 | Wheeler et al. |
| 6,971,069 B2 | 11/2005 | Laiho et al. |
| 6,985,694 B1 | 1/2006 | De Bonet et al. |
| 7,130,608 B2 | 10/2006 | Hollstrom et al. |
| 7,130,616 B2 | 10/2006 | Janik |
| 7,143,939 B2 | 12/2006 | Henzerling |
| 7,236,739 B2 | 6/2007 | Chang |
| 7,236,773 B2 | 6/2007 | Thomas |
| 7,305,624 B1 | 12/2007 | Siegel |
| 7,483,538 B2 | 1/2009 | McCarty et al. |
| 7,571,014 B1 | 8/2009 | Lambourne et al. |
| 7,580,325 B2 | 8/2009 | Welk et al. |
| 7,599,685 B2 | 10/2009 | Goldberg et al. |
| 7,643,894 B2 | 1/2010 | Braithwaite et al. |
| 7,657,224 B2 | 2/2010 | Goldberg et al. |
| 7,657,910 B1 | 2/2010 | McAulay et al. |
| 7,742,740 B2 | 6/2010 | Goldberg et al. |
| 7,774,078 B2 | 8/2010 | Booth et al. |
| 7,835,689 B2 | 11/2010 | Goldberg et al. |
| 7,853,341 B2 | 12/2010 | McCarty et al. |
| 7,865,137 B2 | 1/2011 | Goldberg et al. |
| 7,890,520 B2 | 2/2011 | Tsukazaki et al. |
| 7,912,565 B2 | 3/2011 | Tazine et al. |
| 7,916,877 B2 | 3/2011 | Goldberg et al. |
| 7,917,082 B2 | 3/2011 | Goldberg et al. |
| 7,987,426 B2 | 7/2011 | Cotter et al. |
| 8,014,423 B2 | 9/2011 | Thaler et al. |
| 8,023,663 B2 | 9/2011 | Goldberg |
| 8,028,038 B2 | 9/2011 | Weel |
| 8,028,323 B2 | 9/2011 | Weel |
| 8,045,952 B2 | 10/2011 | Qureshey et al. |
| 8,050,652 B2 | 11/2011 | Qureshey et al. |
| 8,074,253 B1 | 12/2011 | Nathan |
| 8,103,009 B2 | 1/2012 | McCarty et al. |
| 8,135,669 B2 | 3/2012 | Olstad et al. |
| 8,214,873 B2 | 7/2012 | Weel |
| 8,230,099 B2 | 7/2012 | Weel |
| 8,234,395 B2 | 7/2012 | Millington et al. |
| 8,392,468 B2 | 3/2013 | Sato |
| 8,762,843 B2 | 6/2014 | Morse et al. |
| 9,226,072 B2 * | 12/2015 | Bender .................. H04R 5/04 |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2002/0147977 A1 | 10/2002 | Hammett et al. |
| 2003/0013493 A1 | 1/2003 | Irimajiri et al. |
| 2003/0073432 A1 | 4/2003 | Meade |
| 2003/0157951 A1 | 8/2003 | Hasty |
| 2004/0024478 A1 | 2/2004 | Hans et al. |
| 2004/0113952 A1 | 6/2004 | Randall |
| 2004/0252119 A1 | 12/2004 | Hunleth et al. |
| 2005/0154988 A1 | 7/2005 | Proehl et al. |
| 2006/0026535 A1 | 2/2006 | Hotelling et al. |
| 2006/0036942 A1 | 2/2006 | Carter et al. |
| 2006/0095848 A1 | 5/2006 | Naik |
| 2006/0123357 A1 | 6/2006 | Okamura |
| 2006/0173825 A1 | 8/2006 | Hess et al. |
| 2006/0218209 A1 | 9/2006 | Arrouye et al. |
| 2006/0271870 A1 | 11/2006 | Anwar |
| 2006/0282858 A1 | 12/2006 | Csicsatka et al. |
| 2007/0016314 A1 | 1/2007 | Chan et al. |
| 2007/0025194 A1 | 2/2007 | Morse et al. |
| 2007/0083822 A1 | 4/2007 | Robbin et al. |
| 2007/0142944 A1 | 6/2007 | Goldberg et al. |
| 2007/0150830 A1 | 6/2007 | Ording et al. |
| 2007/0156648 A1 | 7/2007 | Bridges et al. |
| 2007/0168875 A1 | 7/2007 | Kowitz et al. |
| 2007/0214106 A1 | 9/2007 | Johnston et al. |
| 2007/0239562 A1 | 10/2007 | Lawson |
| 2007/0248311 A1 | 10/2007 | Wice et al. |
| 2007/0266843 A1 | 11/2007 | Schneider |
| 2008/0040687 A1 | 2/2008 | Randall |
| 2008/0066094 A1 | 3/2008 | Igoe |
| 2008/0086539 A1 | 4/2008 | Bloebaum et al. |
| 2008/0086750 A1 | 4/2008 | Yasrebi et al. |
| 2008/0131085 A1 | 6/2008 | Ikeda et al. |
| 2008/0155588 A1 | 6/2008 | Roberts et al. |
| 2008/0249982 A1 | 10/2008 | Lakowske |
| 2008/0250328 A1 | 10/2008 | Konttinen |
| 2009/0013260 A1 | 1/2009 | Martin et al. |
| 2009/0031254 A1 | 1/2009 | Herpel et al. |
| 2009/0063975 A1 | 3/2009 | Bull et al. |
| 2009/0106297 A1 | 4/2009 | Wright et al. |
| 2009/0157680 A1 | 6/2009 | Crossley et al. |
| 2009/0171715 A1 | 7/2009 | Conley et al. |
| 2009/0234878 A1 | 9/2009 | Herz et al. |
| 2010/0082641 A1 | 4/2010 | Rinckes et al. |
| 2010/0100839 A1 | 4/2010 | Tseng et al. |
| 2010/0254674 A1 | 10/2010 | Prestenback et al. |
| 2010/0293187 A1 | 11/2010 | Biehn et al. |
| 2010/0299639 A1 | 11/2010 | Ramsay et al. |
| 2011/0131272 A1 | 6/2011 | Littlejohn et al. |
| 2011/0161348 A1 | 6/2011 | Oron |
| 2012/0023099 A1 | 1/2012 | Crossley et al. |
| 2012/0059914 A1 | 3/2012 | Banger et al. |
| 2012/0254256 A1 | 10/2012 | Martin |
| 2012/0254363 A1 | 10/2012 | Martin et al. |
| 2013/0148720 A1 | 6/2013 | Rabii |
| 2013/0173034 A1 | 7/2013 | Reimann et al. |
| 2013/0173794 A1 | 7/2013 | Agerbak et al. |
| 2013/0253679 A1 | 9/2013 | Lambourne |
| 2014/0330951 A1 | 11/2014 | Sukoff et al. |

OTHER PUBLICATIONS

"AudioTron Reference Manual, Version 3.0", Voyetra Turtle Beach, Inc., May 2002, 70 pages.

"AudioTron Setup Guide, Version 3.0", Voyetra Turtle Beach, Inc., May 2002, 38 pages.

"Bluetooth. "Specification of the Bluetooth System: The ad hoc SCATTERNET for affordable and highly functional wireless connectivity" Core, Version 1.0 A, Jul. 26, 1999, 1068 pages".

"Bluetooth. "Specification of the Bluetooth System: Wireless connections made easy" Core, Version 1.0 B, Dec. 1, 1999, 1076 pages".

"Dell, Inc. "Dell Digital Audio Receiver: Reference Guide" Jun. 2000, 70 pages".

"Dell, Inc. "Start Here" Jun. 2000, 2 pages".

International Searching Authority, International Search Report and Written Opinion mailed on May 20, 2015, issued in connection with International Application No. PCT/US2015/016623, filed on Feb. 19, 2015, 13 pages.

"Jo, J. et al., "Synchronized One-to-many Media Streaming with Adaptive Playout Control," Proceedings of SPIE, 2002, pp. 71-82, vol. 4861".

"Jones, Stephen. "Dell Digital Audio Receiver: Digital upgrade for your analog stereo" Analog Stereo. Jun. 24, 2000 retrieved Jun. 18, 2014, 2 pages".

kayak.com., "kayak.com search results", Printed Sep. 23, 2013, 3 pages.

"Louderback, Jim. "Affordable Audio Receiver Furnishes Homes With MP3" TechTV Vault. Jun. 28, 2000 retrieved Jul. 10, 2014, 2 pages".

Notice of Allowance mailed on Nov. 4, 2015, issued in connection with U.S. Appl. No. 14/186924, filed Feb. 21, 2014, 5 pages.

"Palm, Inc. "Handbook for the Palm VII Handheld" May 2000, 311 pages".

"Presentations at WinHEC 2000" May 2000, 138 pages.

PRISMIQ; Inc., "PRISMIQ Media Player User Guide", 2003, 44 pages.

roku.com., "Introducing Roku Search", Oct. 29, 2012, 4 pages.

(56) References Cited

OTHER PUBLICATIONS

"UPnP; "Universal Plug and Play Device Architecture"; Jun. 8, 2000; version 1.0; Microsoft Corporation; pp. 1-54".

Non-Final Office Action mailed on Jul. 21, 2015, issued in connection with U.S. Appl. No. 14/186,924, filed Feb. 21, 2014, 8 pages.

* cited by examiner

MEDIA CONTENT SUGGESTION BASED ON PLAYBACK ZONE AWARENESS

CROSS REFERENCE TO RELATED APPLICATIONS

This application claims priority under 35 U.S.C. §120 to, and is a continuation of, U.S. non-provisional patent application Ser. No. 14/186,924, filed on Feb. 21, 2014, entitled "Media Content Based on Playback Zone Awareness," which is incorporated herein by reference in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were severely limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from virtually unlimited sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
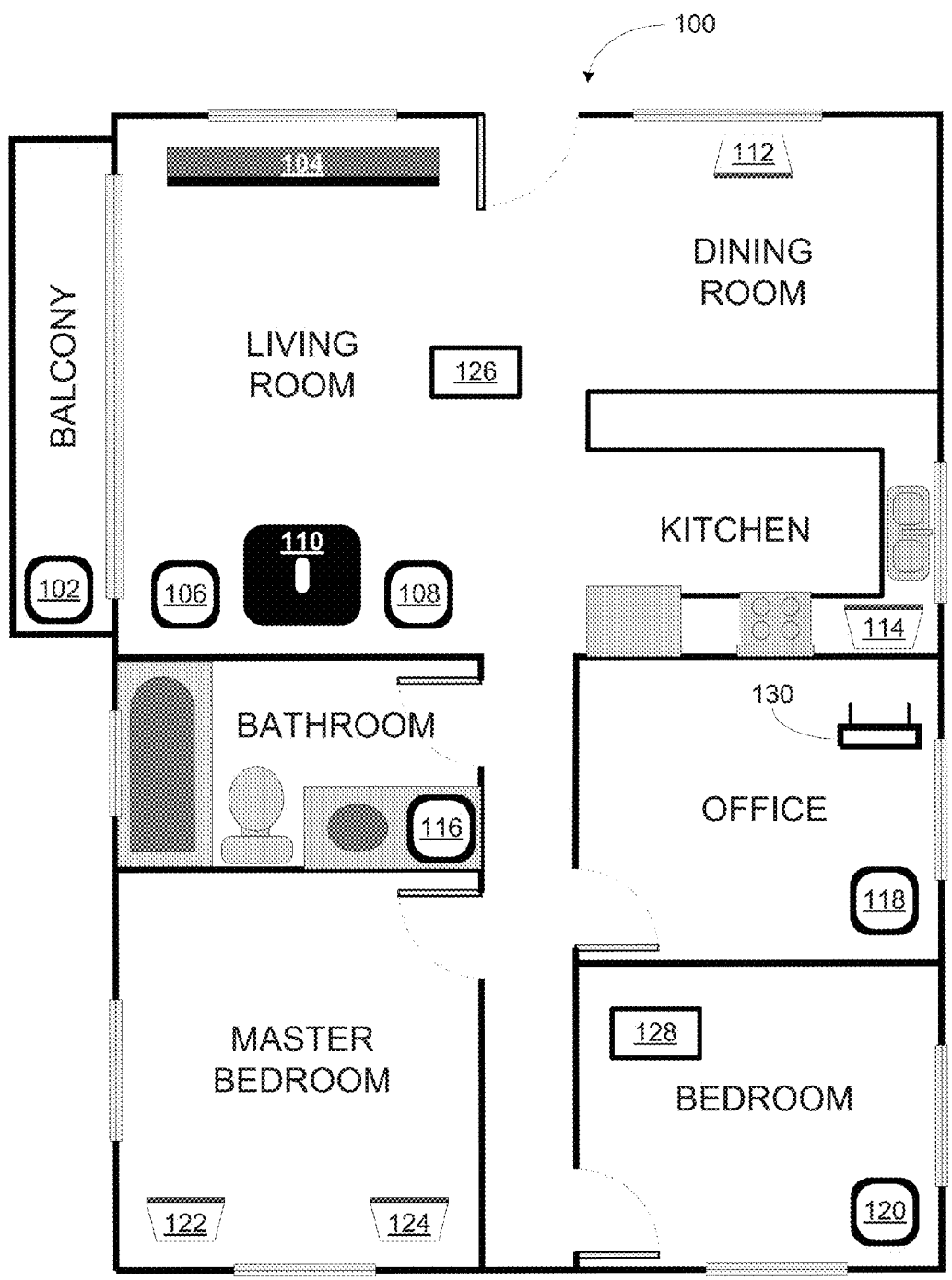
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Embodiments described herein provide media content based on playback zone awareness. In one embodiment, a service provider receives zone data indicating a particular playback zone in a media playback system. Based on the zone data, the service provider sends a selection of audio content to the media playback system. The audio content is played via the particular playback zone.

For example, if a user selects an "Office" zone on a controller interface of a media playback system, the service provider receives the zone selection and correspondingly provides selected media content for the office zone. Selected media content for an office zone may include, for example, music with more instrumental sound than vocals. Other examples are provided herein.

In another embodiment, a media playback system provides a service provider with zone data. The zone data indicates the zone in which the media content is playing or is to be played. The service provider can use the zone data to tailor the media content it sends to the media playback system for playback by in particular zone.

In one example, the zone data may be provided to the service provider by the media playback system when the media system requests media content from the service provider. In another example, the zone data may be provided to the service provider when user feedback to content from the service provider is relayed to the service provider. For instance, some service providers provide user-tailored media content based on feedback received from the user. For instance, a user can provide positive or negative feedback for media content provided by the service provider, and based on the feedback, the service provider may determine media content to subsequently provide to the user.

The present application is directed to providing media content based on playback zone awareness and includes the description of a number of embodiments. In one aspect, for example, a method is provided. The method involves receiving, by a computing device associated with a service provider, zone data. The zone data identifies a zone name and/or type of a zone associated with a playback device of a media playback system. The reception of the zone data indicates a selection of the zone associated with the playback device. The method also involves identifying, by the computing device, media content based on the zone data, and providing, by the computing device, the media content to the media playback system. The media content may be provided to the playback device and/or any other devices in the media playback system.

In another aspect, for example, a device is provided. The device includes a processor and memory having stored thereon instructions executable by the processor to cause the device to perform functions. The functions include receiving, by a computing device associated with a service provider, zone data. The zone data identifies a zone name and/or type of a zone associated with a playback device of a media playback system. The reception of the zone data indicates a selection of the zone. The functions also include identifying, by the computing device, media content based on the zone data, and providing, by the computing device, the media content to the media playback system. The media content may be provided to the playback device and/or any other devices in the media playback system.

In yet another aspect, for example, a non-transitory computer readable memory is provided. The non-transitory computer readable memory has stored thereon instructions executable by a computing device to cause the computing device to perform functions. The functions include receiving, by a computing device associated with a service provider, zone data. The zone data identifies a zone name and/or type of a zone associated with a playback device of a media playback system. The reception of the zone data indicates a selection of the zone associated with the playback device. The functions also include identifying, by the computing device based on the zone data, media content based on the zone data, and providing, by the computing device, the media content to the media playback system. The media content may be provided to the playback device and/or any other devices in the media playback system.

In another aspect, a method is provided. The method involves receiving, by a controller device, zone selection data indicating a selection of a zone; and sending a message, by the controller device, to a service provider. The message includes zone data identifying the zone.

In yet another aspect, a controller device is provided. The controller device includes a processor and memory having stored thereon instructions executable by the processor to cause the controller device to perform functions. The functions include receiving, by a controller device, zone selection data indicating a selection of a zone; and sending a message, by the controller device, to a service provider. The message includes zone data identifying the zone.

In another aspect, a non-transitory computer readable memory is provided. The non-transitory computer readable memory has stored thereon instructions executable by a computing device to cause the computing device to perform functions. The functions include receiving, by a controller device, zone selection data indicating a selection of a zone; and sending a message, by the controller device, to a service provider. The message includes zone data identifying the zone.

In yet another aspect, a method is provided. The method involves associating, by a playback device in a media playback system, the playback device with a zone, and providing to a service provider, by the media playback system, zone data. The zone data may be provided by the playback device. The zone data identifies a zone name and/or type of a zone associated with the playback device. The zone data may also identify additional zones that the playback device is associated with. In other words, the playback device may be associated with a group of zones.

In another aspect, a playback device is provided. The playback device includes a processor and memory having stored thereon instructions executable by the processor to cause the playback device to perform functions. The functions include associating the playback device with a zone, and providing zone data to a service provider. The zone data identifies a zone name and/or type associated with the playback device. The zone data may also identify additional zones that the playback device is associated with. In other words, the playback device may be associated with a group of zones.

In yet another aspect, a non-transitory computer readable memory is provided. The non-transitory computer readable memory has stored thereon instructions executable by a computing device to cause the computing device to perform functions. The functions include associating, by a playback device, the playback device with a zone, and providing to a service provider, by the playback device, zone data. The zone data identifies a zone name and/or type of a zone associated with the playback device. The zone data may also identify additional zones that the playback device is associated with. In other words, the playback device may be associated with a group of zones.

It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
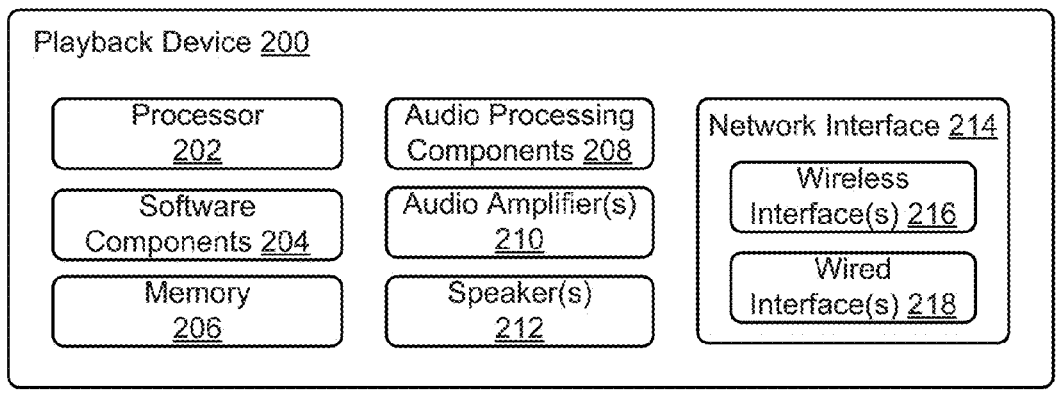
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s)) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
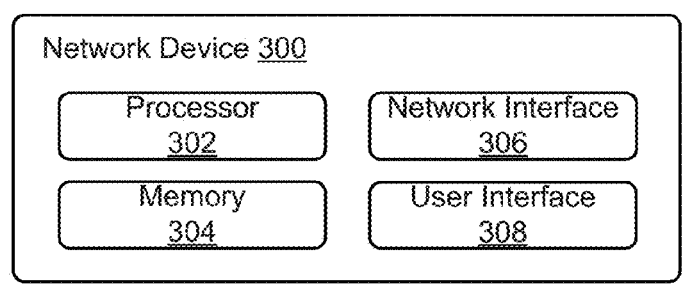
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
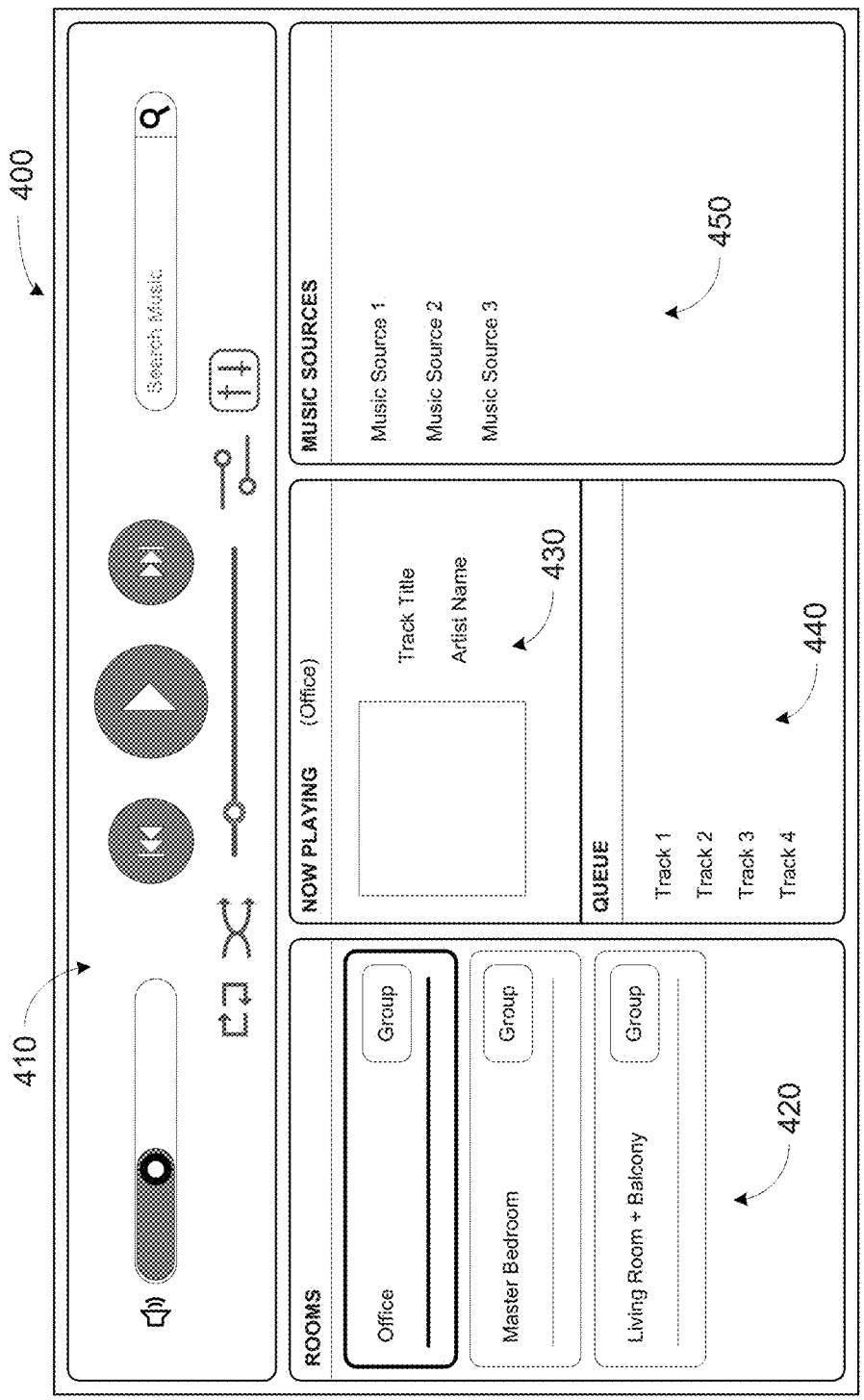
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

Figure 5:
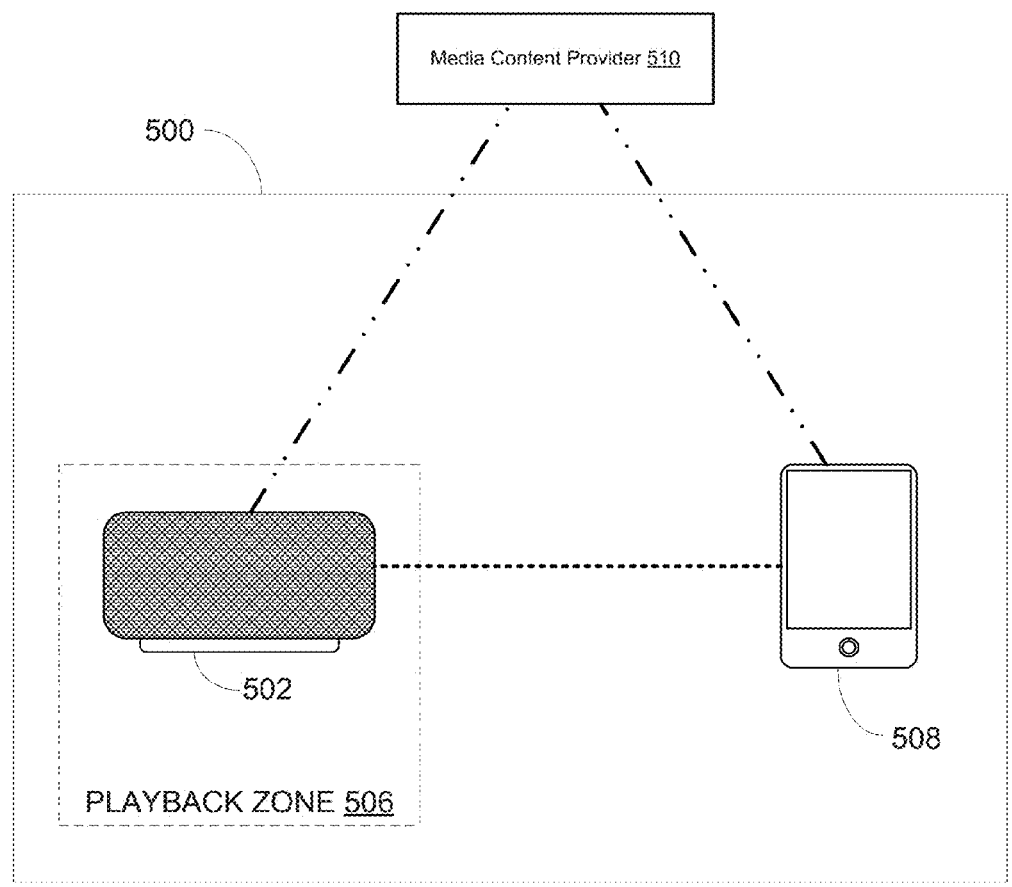
FIG. 5 shows an example configuration of a media playback system and a service provider.

III. Example Methods for Providing Media Content Based on Playback Zone Awareness As discussed above, embodiments described herein involve providing media content based on playback zone awareness. To assist with describing these embodiments, FIG. 5 shows an example configuration of a media playback system 500 and a service provider 510. As shown, the media playback system includes a controller device 508, and a playback device 502 in a playback zone 506. The media playback system 500 may also have additional playback zones that are not shown. In one example, the service provider 510 may be one of several media content sources, such as those discussed above in section II.d, that is in communication with and accessible by the media playback system 500. Playback device 502 may be a playback device similar to that discussed above in section II.a, and controller device 508 may be similar to the control device discussed above in section II.c.

In one example, playback device 502 may be any playback device in a playback zone. Referring back to FIG. 1, playback device 502 may be the playback device 118, in which case the playback zone 506 is "Office," or the playback device 114, in which case the playback zone 506 is "Kitchen." While the example playback zone 506 includes just one playback device 502, one having ordinary skill in the art will appreciate that in the embodiments discussed herein, playback zones may include two or more playback devices, as is the case with the living room playback zone and the master bedroom zone shown in FIG. 1, for example. As previously discussed, playback devices within a playback zone may be configured to play media content in synchrony.

In one example, the service provider 510 may be associated with a remote server, and may be accessible by the media playback system via a wide area network (WAN). As shown, the media playback system may be in communication with the media content source 510 via the playback device 502 and/or the controller device 508. Also shown, and as indicated previously, the controller device 508 may be in communication with playback device 502 to provide media playback commands to the playback device 502. In one case, the controller device 508 may communicate with the playback device 502 over a local area network (LAN). Other cases exist.

a. Example Methods for Providing Playback Zone Information to Service Providers

As previously discussed, the present application involves providing media content based on playback zone awareness. To provide media content based on playback zone awareness, a service provider receives data indicating the playback zone for which the media content is playing or will be playing. Along the same lines, any contextual data, including playback zone information may be provided to the service provider and used by the service provider when generating zone tailored playlists, content streams, or other types of media content. In an embodiment, the zone data is received by the service provider prior to the sending of the selected media content to a media playback system. In another embodiment, the zone data is received by the service provider during the transmission of media content to a media playback system, and thereafter provides zone tailored media content to the media playback system.

Figure 6A:
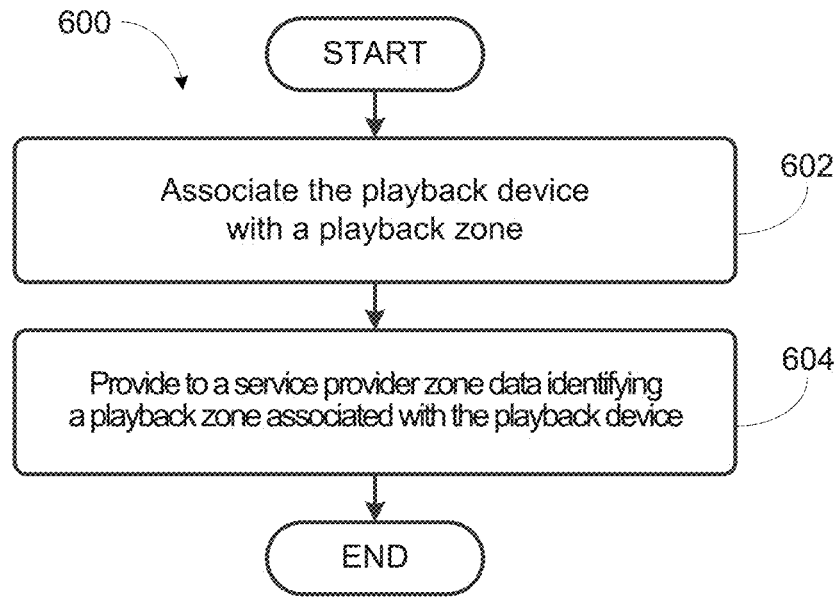
FIG. 6A shows a first example flow diagram for providing playback zone information to a service provider.

FIG. 6A shows an example flow diagram of a method 600 for providing playback zone information to a service provider. Method 600 shown in FIG. 6A presents an embodiment of a method that can be implemented within an operating environment involving, for example, the media playback system 100 of FIG. 1, one or more of the playback device 200 of FIG. 2, one or more of the control device 300 of FIG. 3, and one or more of the media playback system 500 of FIG. 5. Method 600 may include one or more operations, functions, or actions as illustrated by one or more of blocks 602-604. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 600 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 600 and other processes and methods disclosed herein, each block in FIG. 6A may represent circuitry that is wired to perform the specific logical functions in the process.

At block 602, the method 600 involves a playback device associating with a playback zone. In one example, as shown in FIG. 5, the playback device 502 may be assigned to the playback zone 506. The playback device 502 may have been assigned to the playback zone 506 when the playback device 502 is powered up or when the playback device 502 is added to the media playback system 500. In some instances, the playback device 502 may be assigned to different playback zones over time. Zone data that identifies the playback zone that the playback device 502 is presently assigned to may be stored on a device. In some embodiments, the zone data is stored on the playback device 502 in the form of a state variable. In other embodiments, the zone data is stored on a controller device such as the controller device 508, or another playback device in the media playback system 500, or on a remote server.

At block 604, the method 600 involves the playback device providing to a service provider zone data identifying a playback zone that is associated with the playback device. The zone data may be sent directly from the playback device or via another device in the media playback system. For instance, if the playback device is part of a consolidated player or if the playback zone is in a zone group, any of the other playback devices in the consolidated player or playback zones of the zone group may send the zone data. The zone data may include, for example, a zone name such as "Kitchen," "Office," "Bedroom," "Gym," and so on. The zone data may include, for example, characteristics of the zone, like a preference for instrumental music versus vocal music. The zone data may include both a zone name and one or more zone characteristics. Other examples are possible.

In an example referring back to FIG. 5, the playback device 502 sends the zone data directly to the service provider 510 via a wide area network. In another case, the playback device 502 sends the zone data to the service provider 510 from the controller device 508 via the wide area network. In one example, the service provider 510 may store the zone data on a server or storage medium associated with the service provider 510, and may access the zone data when providing media content to the playback device 502, as will be discussed later.

In another example, the playback device 502 provides the zone data to the service provider 510 when the playback device 502 is requesting and/or retrieving media content from the service provider 510. For instance, if a user accesses the playback device 502 (via the controller device 508, for example) to cause the playback device 502 to play media content from the service provider 510, the playback device 502 may communicate with the service provider 510 to request and/or retrieve media content. The playback device 502 may accordingly provide the zone data when communicating with the service provider 510 to request and/or retrieve media content. In other words, one or more network messages sent to the service provider might comprise a request for media content and zone data for which the media content will be played (e.g., the one or more messages might comprise (1) play "Bill Evans" artist channel; (2) living room).

In another example, the playback device 502 may provide the zone data to the service provider 510 periodically, such as once a day, for example. In another example, the playback device 502 may provide the zone data to the service provider 510 in response to a request from the service provider 510. For instance, the service provider 510 may request information, including the zone data, associated with the playback device 502 when the playback device 502 first establishes communication with the service provider 510.

In yet another example, the playback device 502 may provide the zone data to the service provider 510 when the playback device receives an input indicating that the playback zone 506 has been selected, potentially for media content playback. In other words, the playback device 502 may provide the zone data to the service provider 510 when the user selects the playback zone 506 via the controller device 508, whether or not the user subsequently requests media content to be played in the playback zone 506.

In the case multiple service providers including the service provider 510 are in communication with the media playback system 500, the playback device 502 may provide the zone data to each of the service providers or a service provider that has most recently provided media content to the playback device 502 for playback in the playback zone 506. Other examples are also possible.

In a further example, the playback device 502 may provide the zone data to the service provider 510 along with feedback data indicating a preference rating for a particular media content provided by the service provider 510. In other words, providing zone data to the service provider 510 may involve the playback device 502 receiving feedback data indicating a preference rating for a particular media content provided by the service provider 510 and played in the playback zone 506, and providing the zone data to the service provider 510 when providing the feedback data to the service provider 510.

As discussed previously, the service provider 510 may be a service provider that provides zone tailored media content playlists or media content streams, based partially on feedback from the user. In one case, the user may provide positive or negative feedback on a particular media content provided by the service provider 510, and the service provider 510 may determine media content to be subsequently provided to the user partially based on the feedback. In such a case, it may also be useful for the service provider 510 to receive the zone data, which in this example may identify the playback zone 506 as the playback zone in which the particular media content was played when the user provided the feedback. The service provider 510 may use the zone data and the associated feedback to determine media content to be subsequently provided to the user.

Figure 6B:
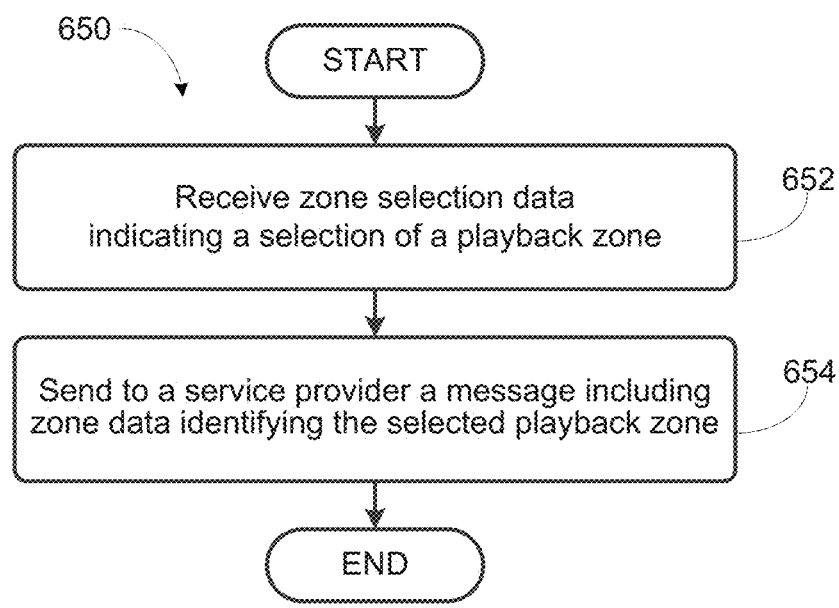
FIG. 6B shows a second example flow diagram for providing playback zone information to a service provider.

As previously indicated, the media playback system 500 of FIG. 5 may provide playback zone information to the service provider 510 via the playback device 502 as discussed above, and/or the controller device 508, as will be discussed below. FIG. 6B shows an example flow diagram of a method 650 for providing playback zone information to a service provider. Method 650 shown in FIG. 6B presents an embodiment of a method that can be implemented within an operating environment involving, for example, the media playback system 100 of FIG. 1, one or more of the playback device 200 of FIG. 2, one or more of the control device 300 of FIG. 3, and one or more of the media playback system 500 of FIG. 5. Method 650 may include one or more operations, functions, or actions as illustrated by one or more of blocks 652-654. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

At block 652, the method 650 involves receiving zone selection data indicating a selection of a playback zone. In one example, the user may be using the controller device 508 to select media content to be played in the playback zone 506. To do this, the user may select the playback zone 506 in the media playback system 100 via an interaction with the controller device 508. The controller device 508 may also receive an input identifying a service provider. The input may be a user-selection of the service provider 510 using the controller device 508. In one case, the controller device 508, prior to receiving the input, may display one or more selectable content providers, and the received input may indicate a selection of the service provider 510 from the one or more selectable content providers. The one or more selectable content providers may be displayed in response to a selection of the playback zone 506. Alternatively, the one or more selectable content providers may be displayed prior to receiving the selection of the playback zone 506.

In some embodiments, the one or more selectable content providers displayed by the controller device 508 may be media content applications associated with one or more service providers. In such a case, the input my involve the user selecting a media content application associated with the service provider 510, resulting in the media content application associated with the service provider 510 being launched by the controller device 508. In some other embodiments, the one or more selectable content providers displayed by the controller device 508 may displayed in the form of a list of service providers within a controller application associated with the media playback system 500. In this case, the input may involve the user selecting the service provider 510 from the list of displayed service providers. In either case, the user may be selecting the service provider to provide media content to be played in a playback zone of the media playback system 500, such as the playback device 502 in playback zone 506.

At block 654, the method 650 involves the controller device sending to the service provider, a message including zone data identifying a name of a zone associated with a playback device As discussed above in connection to the method 600 of FIG. 6A, the zone data may identify a playback zone associated with a playback device that the user may want the service provider 510 to provide media content for. Continuing with the above examples, the playback zone may be the playback zone 506 with the playback device 502.

As indicated above, the controller device 508 may receive zone selection data indicating a selection of the playback zone 506 either before or after receiving the input identifying the selection of the service provider 510. For instance, if the service provider 510 was selected via a selection and launching of the media content application associated with the service provider 510, the media content application may, upon being launched, prompt the user to select a playback zone, such as the playback zone 506 in the media playback system 500, or another audio rendering means (i.e. via a headphone connected to the controller device). In another instance, if the service provider 510 was selected from a list of service providers displayed within a controller application associated with the media playback system 500, the user may have selected the playback zone 506 prior to selecting the service provider 510. Other examples are also possible.

In one example, the playback device 502 may receive a notification from the controller device 508 upon a selection of the playback zone 506 by the user via the controller device 508. The playback device 502 may responsively send the zone data associated with the playback device 502 to the controller device 508. The controller device 508 in this example may subsequently provide the received zone data associated with the playback device 502 (identifying the playback zone 506) to the service provider 510.

In one example, the controller device 508 may receive zone data from the playback device 502 identifying the playback zone 506 when either the controller device 508 or the playback device 502 was first added to the media playback system 500. The playback device 502 may subsequently provide zone data to the controller device 508 periodically, or when there are any changes to the zone data, such as if the playback device 502 was moved and/or assigned to a different playback zone. The controller device 508 may then provide the zone data to the service provider 510 periodically, or whenever an updated zone data is received from the playback device 502. In another example, the message may be sent by the controller device 508 to the service provider 510 in response to receiving the input identifying the service provider 510. In yet another example, the message may be sent by the controller device 508 to the service provider 510 in response receiving another input from user. For instance, the message may be sent to the service provider 510 upon receiving a play command from the user to cause media content provided by the service provider 510 to be played by the playback device 502 in playback zone 506. Other examples are also possible.

As indicated above, the service provider 510 may then provide media content to be played by the playback device 502 in playback zone 506 partially based on the received zone data. The controller device 508 may receive from the service provider 510, information identifying the media content that is provided to the playback device 502. The information identifying the media content may include metadata associated with the media content. For instance, if the media content is a music track, the information may include track title, album title, artist name, release year, record label, and album art, among others.

In such a case, the controller device 508 may further display at least a portion of the information identifying the media content while the media content is being played by the playback device 502. The controller device 508 may in some cases also display an indication that the media content is based on the zone data. For instance, when displaying information identifying the media content being played, the controller device 508 may also provide textual or graphical icons indicating that the media content is being played in the playback zone 506. Other examples are also possible.

Figure 7:
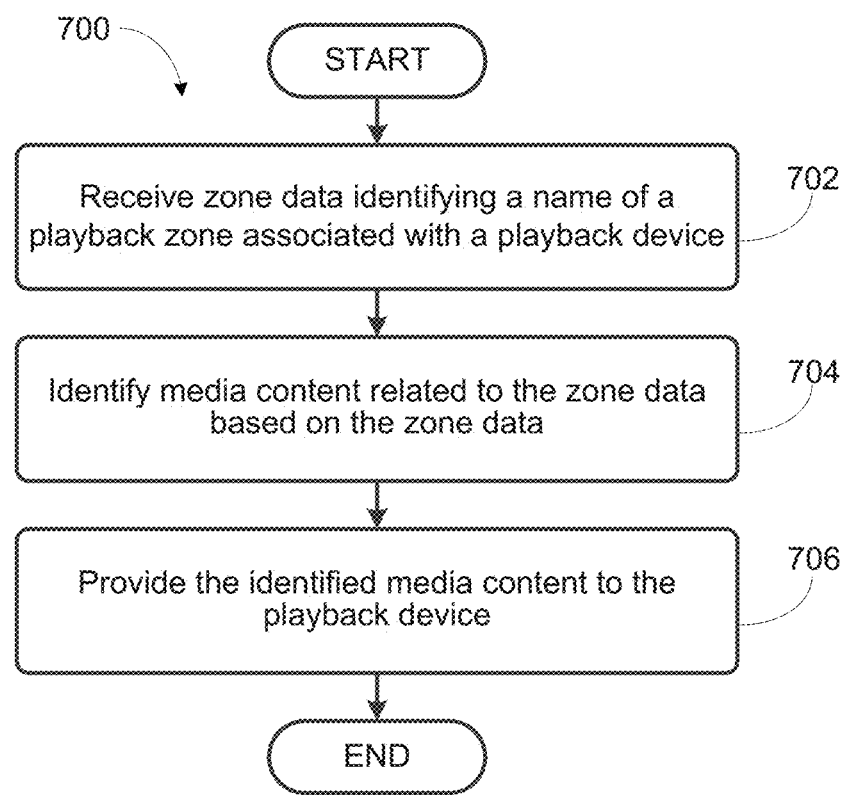
FIG. 7 shows an example flow diagram for providing media content based on playback zone information.

While the zone data discussed in the examples connected to methods 600 and 650 above generally identify a playback zone with a household, one having ordinary skill in the art will appreciate that the zone data may also identify other contextual information such as time, day, week, month, and/or season, playback zone groupings, playback volumes, and playback device configurations, among others that may be based upon by the service provider 510 to determine media content to subsequently provide to the user.

b. Example Method for Providing Media Content Based on Playback Zone Information As indicated previously, the service provider may provide media content based on the zone data received from the media playback system 500 (e.g., either via a playback device, such as the playback device 502, or the controller device 508). FIG. 7 shows an example flow diagram for providing media content based on playback zone information. Method 700 shown in FIG. 7 presents an embodiment of a method that can be implemented within a system in communication with a media playback system such as the media playback system 100 of FIG. 1, one or more of the playback device 200 of FIG. 2, one or more of the control device 300 of FIG. 3, and one or more of the media playback system 500 of FIG. 5. For instance, method 700 may be implemented within a server associated with the service provider 510 of FIG. 5. Method 700 may include one or more operations, functions, or actions as illustrated by one or more of blocks 702-706. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

At block 702, the method 700 involves a computing device, such as the server associated with the service provider 510 of FIG. 5, receiving zone data identifying a name of a zone associated with a playback device. As previously discussed, the service provider 510 may receive from the media playback system 500 zone data identifying the playback zone 506. The zone data may be received from the playback device 502 that is in the playback zone, the controller device 508, or other components of the media playback system 500. For instance, a service provider 510 receives one or more network messages that comprise a some identification of a user location, such as a household identification (HHID) identifying a household within which the media playback system 500 is implemented, one or more user accounts associated with the media playback system 500 and the service provider 510, a request for media content, and/or a zone and/or characteristics of the zone in which the media content is to be played.

As previously indicated in connection to methods 600 and 650, in one example, the zone data may be received upon a selection of a playback zone, such as the playback zone 506. In other words, reception of the zone data may indicate a selection of the playback zone 506. In one case, the zone data may be received along with a request from the media playback system 500 for media content to be played in the selected playback zone. In this case, reception of the zone data may indicate that the media content being requested from the service provider 510 is to be played in the playback zone 506.

In another example, if the service provider 510 provides user-tailored media content derived from user provided feedback on media content provided and played, the zone data may further identify a content rating or feedback on particular media content that is or was being played by the playback device 502 in playback zone 506. As such, the feedback of the user on the particular media content may also indicate the playback zone 506 in which the user was experiencing the media content when providing the feedback or content rating.

In yet another example, the zone data may be received when the playback device 502 is added to the media playback system and/or when the playback zone 506 is established. In such a case, the service provider 510 may store the zone data on the server associated with the service provider 510 for future reference. For instance, in some embodiments, if zone data is provided upon initial setup of the playback device 502, and not otherwise provided to the service provider 510, the service provider 510 may reference the previously stored zone data when providing media content.

At block 704, the method 700 involves the computing device identifying media content based on the zone data. Media content identified by the computing device based on the zone data may include individual media items, playlists of media items, variable streaming media content, and streaming Internet radio, among others. In one example, if the service provider 510 offers customized or catered playlists, the service provider 510 may identify a playlist, or generate a playlist based on the zone data. For instance, if the playback zone 506 is an office, the service provider 510 may identify playlists, or media content more likely suitable for working or studying. On the other hand, if the playback zone 506 is a kitchen, the media playback device may identify playlists or media content suitable for cooking, entertaining, or cleaning up after a party. Similarly, if the zone data indicates a specific grouping of playback zones in the media playback system 500, such as a "party mode" when all playback zones in the media playback system 500, including playback zone 506, are combined into one zone group, the service provider 510 may identify playlists or media content suitable for house-wide social events.

In another example, the service provider 510 may identify media content for generating playlists according to an algorithm. In this case, if contextual data, such as the time of day or day of week is used as inputs to the algorithm, the received zone data may be used as an input to the algorithm. Along the same lines, if the service provider 510 generates catered media content based on a series of contextual data provided by the user, any playback zone related contextual information may be pre-filled based on the received zone data. For example, if the user is "playing video games" in the "living room" with his "friends," the user may provide data indicating the activity of "playing video games," and the social context of "friends," but the locational information of "living room" may be pre-filled because the user previously selected a "Living Room" zone when accessing the media playback system 500 to play media content in the living room.

In another example, if the service provider 510 offers user-tailored playlists based on a user's feedback on previously provided media content and zone data was provided along with the user's feedback, the service provider 510 may identify media content for the user-tailored playlist based on the user's feedback on previously provided media content as well as the playback zone(s) in which the media content was played when the user provided the feedback. For instance, if a user provided negative feedback while listening to particular media content in the kitchen, the service provider 510 may not provide the particular media content, or similar media content, to the kitchen in the future. However, the service provider 510 may still provide the particular media content (or similar media content) service provider to the office or some other zone, for example, unless the user also provided negative feedback when the particular media content was previously played in the office, or the feedback was universally applied to all zones.

At block 706, the method 700 involves providing the identified media content to the playback device. Upon identifying media content based partially on the received zone data, the service provider 510 may then provide to the playback device 502 media content to be played by the playback device 502 in the playback zone 506. In some cases, the media content may be provided to the playback device 502 in the form of streaming content, such that the playback device 502 may begin rendering the media content while the media content is still being provided, and continues to be provided to the playback device. In some other cases, the media content may be provided to the playback device 502 as one or more complete data files In one example, the service provider 510 may also provide to the controller device 508 information identifying the provided media content to be displayed to the user. The information identifying the provided media content may be displayed by the controller device 508 such that the user accessing the media playback system 500 via the controller device 508 may view information on the media content being played by the playback device 502 in the playback zone 506.

In some cases, the service provider 510 may identify multiple media content, such as different playlists or channels, based on the zone data. As such, in one example, providing the identified media content to the playback device 502 may further involve receiving one or more messages from the controller device 508, the playback device 502 or some other device, indicating a subsequent selection from the various identified media content. In other words, the service provider 510 may provide to the controller device 508 a list of selectable media content that the service provider 510 identified based on the zone data. The user may then select media content from the list of media items displayed by the controller device 508. In one case, a selection of media content by the user may cause the controller device 508 to send a message to the service provider 510 requesting the selected media content. In response to the request, the service provider 510 may then provide the selected media content to the playback device 502. Other interactions to facilitate playback of media content provided by the service provider 510 by the playback device 502 may also be possible.

In some cases, the media playback device 502 may begin rendering the media content upon receiving the media content from the service provider. In some other cases, the playback device 502 may cache the received media content and wait for an input from the controller device 508 indicating that the playback device 502 is to render the received media content before rendering the received media content in the playback zone 506. Other examples are also possible.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As discussed above, the present application is directed to providing media content based on playback zone awareness and includes the description of a number of embodiments. In one aspect, for example, a method is provided. The method involves receiving, by a computing device associated with a service provider, zone data. The zone data identifies a zone name and/or type of a zone associated with a playback device of a media playback system. The reception of the zone data indicates a selection of the zone associated with the playback device. The method also involves identifying, by the computing device, media content based on the zone data, and providing, by the computing device, the media content to the media playback system. The media content may be provided to the playback device and/or any other devices in the media playback system.

In another aspect, for example, a device is provided. The device includes a processor and memory having stored thereon instructions executable by the processor to cause the device to perform functions. The functions include receiving, by a computing device associated with a service provider, zone data. The zone data identifies a zone name and/or type of a zone associated with a playback device of a media playback system. The reception of the zone data indicates a selection of the zone. The functions also include identifying, by the computing device, media content based on the zone data, and providing, by the computing device, the media content to the media playback system. The media content may be provided to the playback device and/or any other devices in the media playback system.

In yet another aspect, for example, a non-transitory computer readable memory is provided. The non-transitory computer readable memory has stored thereon instructions executable by a computing device to cause the computing device to perform functions. The functions include receiving, by a computing device associated with a service provider, zone data. The zone data identifies a zone name and/or type of a zone associated with a playback device of a media playback system. The reception of the zone data indicates a selection of the zone associated with the playback device. The functions also include identifying, by the computing device based on the zone data, media content based on the zone data, and providing, by the computing device, the media content to the media playback system. The media content may be provided to the playback device and/or any other devices in the media playback system.

In another aspect, a method is provided. The method involves receiving, by a controller device, zone selection data indicating a selection of a zone; and sending a message, by the controller device, to a service provider. The message includes zone data identifying the zone.

In yet another aspect, a controller device is provided. The controller device includes a processor and memory having stored thereon instructions executable by the processor to cause the controller device to perform functions. The functions include receiving, by a controller device, zone selection data indicating a selection of a zone; and sending a message, by the controller device, to a service provider. The message includes zone data identifying the zone.

In another aspect, a non-transitory computer readable memory is provided. The non-transitory computer readable memory has stored thereon instructions executable by a computing device to cause the computing device to perform functions. The functions include receiving, by a controller device, zone selection data indicating a selection of a zone; and sending a message, by the controller device, to a service provider. The message includes zone data identifying the zone.

In yet another aspect, a method is provided. The method involves associating, by a playback device in a media playback system, the playback device with a zone, and providing to a service provider, by the media playback system, zone data. The zone data may be provided by the playback device. The zone data identifies a zone name and/or type of a zone associated with the playback device. The zone data may also identify additional zones that the playback device is associated with. In other words, the playback device may be associated with a group of zones.

In another aspect, a playback device is provided. The playback device includes a processor and memory having stored thereon instructions executable by the processor to cause the playback device to perform functions. The functions include associating the playback device with a zone, and providing zone data to a service provider. The zone data identifies a zone name and/or type associated with the playback device. The zone data may also identify additional zones that the playback device is associated with. In other words, the playback device may be associated with a group of zones.

In yet another aspect, a non-transitory computer readable memory is provided. The non-transitory computer readable memory has stored thereon instructions executable by a computing device to cause the computing device to perform functions. The functions include associating, by a playback device, the playback device with a zone, and providing to a service provider, by the playback device, zone data. The zone data identifies a zone name and/or type of a zone associated with the playback device. The zone data may also identify additional zones that the playback device is associated with. In other words, the playback device may be associated with a group of zones.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A method comprising:
   receiving, via a computing system associated with a service provider, zone data that identifies a particular zone of a media playback system, wherein the zone data indicates a selection of the particular zone, and wherein the particular zone includes one or more playback devices;
   identifying, via the computing system, audio content based on the zone data, wherein identifying audio content based on the zone data comprises determining that particular audio content is preferred in the particular zone and identifying audio content corresponding to the particular audio content that is preferred in the particular zone;
   providing, via the computing system, an indication of the identified audio content to the media playback system;
   receiving, via the computing system, data indicating one or more audio items that were selected from the identified audio content via the media playback system; and
   providing, via the computing system to the media playback system, an indication of the one or more audio items that were selected from the identified audio content, the indication comprising respective sources from which the one or more audio items are retrievable by the media playback system.

2. The method of claim 1, wherein providing the indication of the identified audio content to the media playback system comprises providing metadata associated with the identified audio content for display by a control device of the media playback system.

3. The method of claim 1, wherein the zone data indicates a name of the particular zone associated with a playback device, wherein determining that particular audio content is preferred in the particular zone comprises determining that the name of the particular zone associated with the playback device indicates a particular type of room, and wherein identifying audio content corresponding to the particular audio content that is preferred in the particular zone comprises identifying audio content corresponding to the particular type of room.

4. The method of claim 3, wherein identifying audio content corresponding to the particular type of room comprises determining that playback of a particular genre of audio content is preferred in the particular type of room, and identifying audio content corresponding to the particular genre of audio content.

5. The method of claim 1, wherein determining that particular audio content is preferred in the particular zone comprises determining, based on audio preference data, that playback of certain audio content is preferred in the particular zone at a given time of day; and wherein identifying audio content corresponding to the particular audio content that is preferred in the particular zone comprises identifying audio content that corresponds to the certain audio content that is preferred in the particular zone at the given time of day.

6. The method of claim 1, wherein determining that particular audio content is preferred in the particular zone comprises determining that the particular zone is associated with respective content ratings of audio items, and wherein identifying audio content corresponding to the particular audio content that is preferred in the particular zone comprises identifying, based on the respective content ratings of audio items, audio content that has respective content ratings that exceed a threshold rating.

7. The method of claim 1, further comprising:
   receiving audio preference data indicating one or more of:
      (i) particular audio items that have been played back via the one or more playback devices of the particular zone,
      (ii) respective content rankings of particular audio items that have been played back via the one or more playback devices of the particular zone; and (iii) favorite audio items associated with the particular zone;
   wherein determining that particular audio content is preferred in the particular zone comprises determining that the audio preference data indicates that certain audio content is preferred in the particular zone, and wherein identifying audio content corresponding to the particular audio content that is preferred in the particular zone identifying media content corresponding to the certain audio content is preferred in the particular zone.

8. The method of claim 1, wherein the zone data indicates that the particular zone is a first zone of a particular zone group that comprises the first zone and one or more particular second zones, wherein the one or more particular second zones comprise one or more respective playback devices and wherein identifying audio content based on the zone data comprises determining that particular audio content is preferred in the particular zone group when the first zone is in the particular zone group and identifying audio content corresponding to the particular audio content preferred when the first zone is in the particular zone group.

9. The method of claim 1, wherein the zone data indicates that the particular zone is a first zone of a particular zone group that comprises the first zone and one or more particular second zones, wherein the one or more particular second zones comprise one or more respective playback devices, wherein determining that particular audio content is preferred in the particular zone comprises determining that particular audio content is preferred in the particular zone group when the first zone is in the particular zone group, and wherein identifying audio content corresponding to the particular audio content that is preferred in the particular zone comprises identifying audio content corresponding to the particular audio content preferred when the first zone is in the particular zone group.

10. A non-transitory computer-readable medium having stored therein instructions executable by one or more processors to cause a computing system to perform operations comprising:

receiving, via one or more network interfaces, zone data that identifies a particular zone of a media playback system, wherein the zone data indicates a selection of the particular zone, and wherein the particular zone includes one or more playback devices;

identifying audio content based on the zone data, wherein identifying audio content based on the zone data comprises determining that particular audio content is preferred in the particular zone and identifying audio content corresponding to the particular audio content that is preferred in the particular zone;

providing, via the one or more network interfaces, an indication of the identified audio content to the media playback system;

receiving, via the one or more network interfaces, data indicating one or more audio items that were selected from the identified audio content via the media playback system; and providing, via the one or more network interfaces to the media playback system, an indication of the one or more audio items that were selected from the identified audio content, the indication comprising respective sources from which the one or more audio items are retrievable by the media playback system.

11. The non-transitory computer-readable medium of claim 10, wherein providing the indication of the identified audio content to the media playback system comprises providing metadata associated with the identified audio content for display by a control device of the media playback system.

12. The non-transitory computer-readable medium of claim 10, wherein the zone data indicates a name of the particular zone associated with a playback device, wherein determining that particular audio content is preferred in the particular zone comprises determining that the name of the particular zone associated with the playback device indicates a particular type of room, and wherein identifying audio content corresponding to the particular audio content that is preferred in the particular zone comprises identifying audio content corresponding to the particular type of room.

13. The non-transitory computer-readable medium of claim 12, wherein identifying audio content corresponding to the particular type of room comprises determining that playback of a particular genre of audio content is preferred in the particular type of room, and identifying audio content corresponding to the particular genre of audio content.

14. The non-transitory computer-readable medium of claim 10, wherein determining that particular audio content is preferred in the particular zone comprises determining, based on audio preference data, that playback of certain audio content is preferred in the particular zone at a given time of day; and wherein identifying audio content corresponding to the particular audio content that is preferred in the particular zone comprises identifying audio content that corresponds to the certain audio content that is preferred in the particular zone at the given time of day.

15. The non-transitory computer-readable medium of claim 10, wherein determining that particular audio content is preferred in the particular zone comprises determining that the particular zone is associated with respective content ratings of audio items, and wherein identifying audio content corresponding to the particular audio content that is preferred in the particular zone comprises identifying, based on the respective content ratings of audio items, audio content that has respective content ratings that exceed a threshold rating.

16. The non-transitory computer-readable medium of claim 10, wherein the operations further comprise receiving audio preference data indicating one or more of: (i) particular audio items that have been played back via the one or more playback devices of the particular zone, (ii) respective content rankings of particular audio items that have been played back via the one or more playback devices of the particular zone; and (iii) favorite audio items associated with the particular zone, and wherein determining that particular audio content is preferred in the particular zone comprises determining that the audio preference data indicates that certain audio content is preferred in the particular zone, and wherein identifying audio content corresponding to the particular audio content that is preferred in the particular zone identifying media content corresponding to the certain audio content is preferred in the particular zone.

17. The non-transitory computer-readable medium of claim 10, wherein the zone data indicates that the particular zone is a first zone of a particular zone group that comprises the first zone and one or more particular second zones, wherein the one or more particular second zones comprise one or more respective playback devices and wherein identifying audio content based on the zone data comprises determining that particular audio content is preferred in the particular zone group when the first zone is in the particular zone group and identifying audio content corresponding to the particular audio content preferred when the first zone is in the particular zone group.

18. A computing system configured to:

receive, via one or more network interfaces, zone data that identifies a particular zone of a media playback system, wherein the zone data indicates a selection of the particular zone, and wherein the particular zone includes one or more playback devices;

identify audio content based on the zone data, wherein identifying audio content based on the zone data comprises determining that particular audio content is preferred in the particular zone and identifying audio content corresponding to the particular audio content that is preferred in the particular zone;

provide, via the one or more network interfaces, an indication of the identified audio content to the media playback system;

receive, via the one or more network interfaces, data indicating one or more audio items that were selected from the identified audio content via the media playback system; and provide, via the one or more network interfaces to the media playback system, an indication of the one or more audio items that were selected from the identified audio content, the indication comprising respective sources from which the one or more audio items are retrievable by the media playback system.

19. The computing system of claim 18, wherein providing the indication of the identified audio content to the media playback system comprises providing metadata associated with the identified audio content for display by a control device of the media playback system.

20. The computing system of claim 18, wherein the zone data indicates a name of the particular zone associated with a playback device, wherein determining that particular audio content is preferred in the particular zone comprises determining that the name of the particular zone associated with the playback device indicates a particular type of room, and wherein identifying audio content corresponding to the particular audio content that is preferred in the particular zone comprises identifying audio content corresponding to the particular type of room.

* * * * *